May 17, 1932. G. C. BEIDLER 1,859,258
PHOTOGRAPHING APPARATUS
Filed Oct. 9, 1931 3 Sheets-Sheet 1
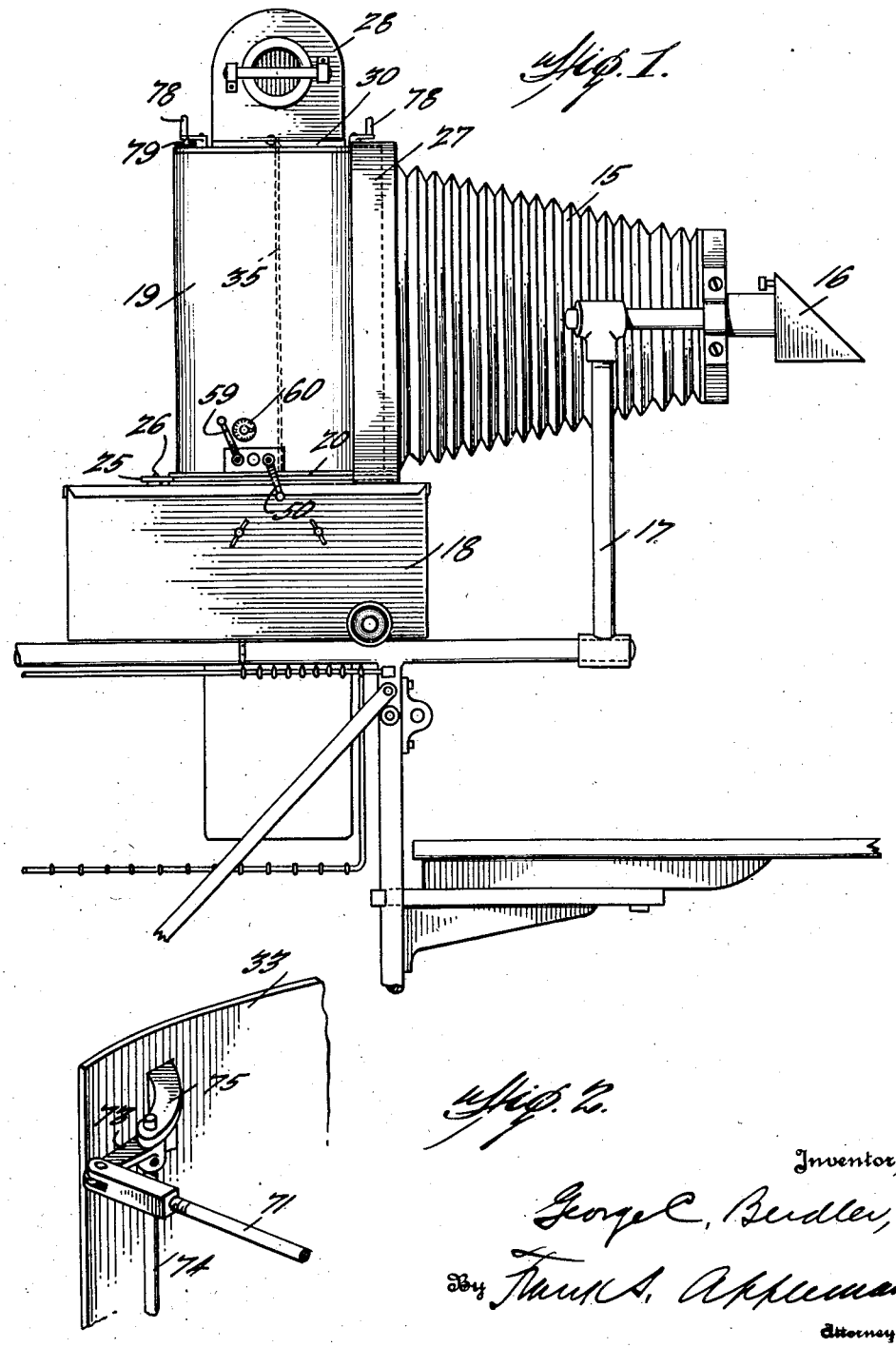

May 17, 1932.  G. C. BEIDLER  1,859,258
PHOTOGRAPHING APPARATUS
Filed Oct. 9, 1931  3 Sheets-Sheet 2
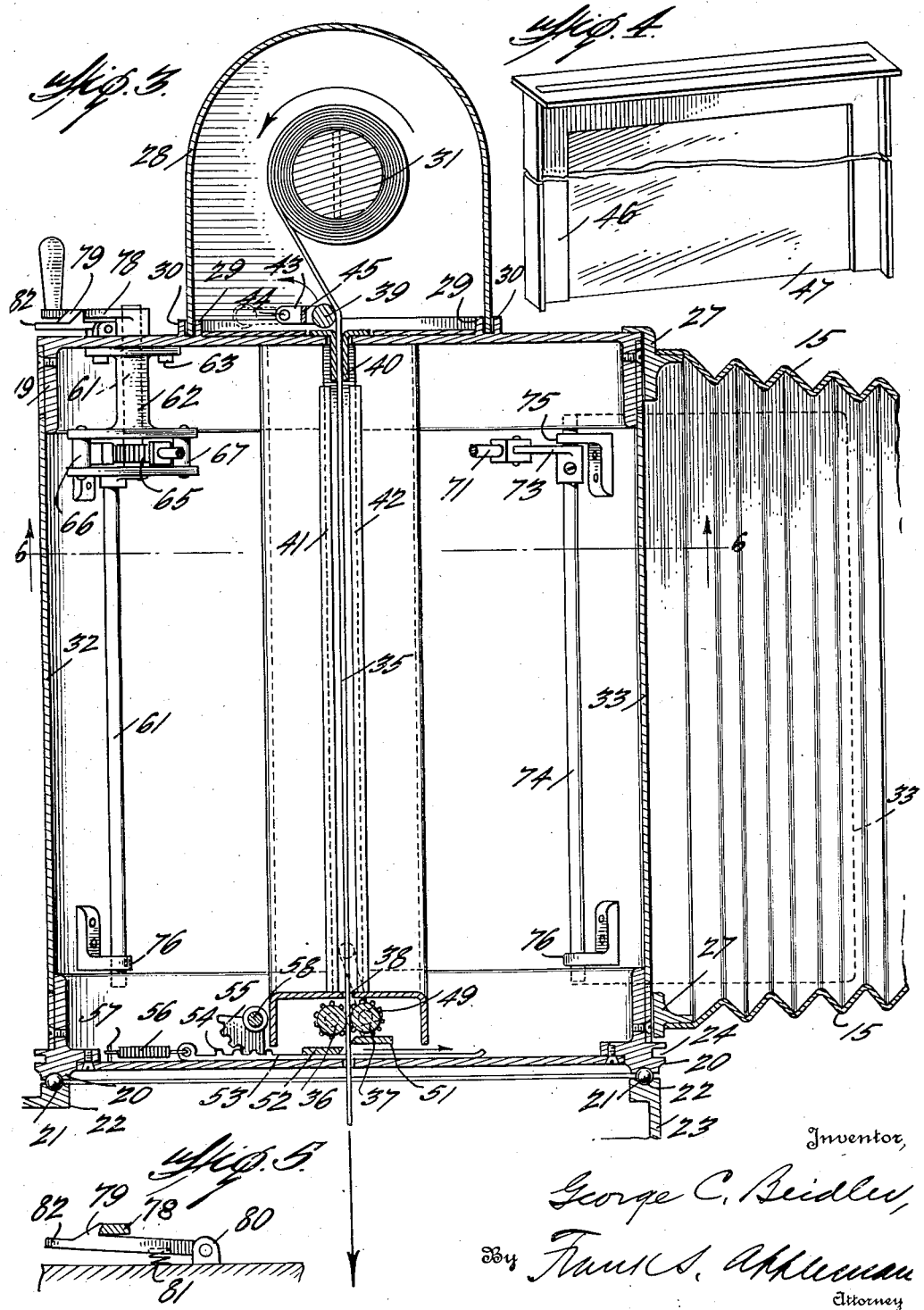

May 17, 1932. G. C. BEIDLER 1,859,258
PHOTOGRAPHING APPARATUS
Filed Oct. 9, 1931 3 Sheets-Sheet 3
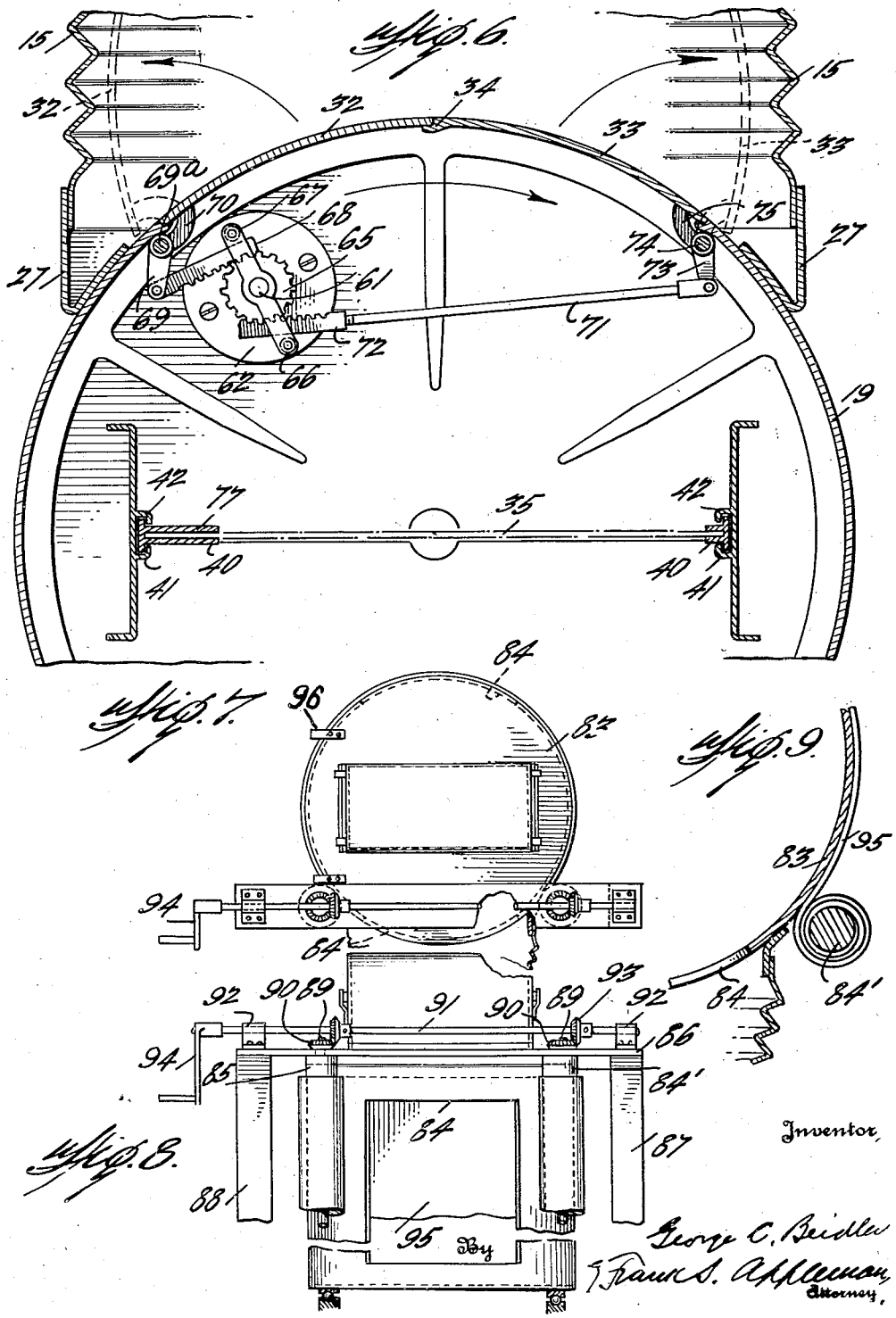

Patented May 17, 1932

1,859,258

UNITED STATES PATENT OFFICE

GEORGE C. BEIDLER, OF ROCHESTER, NEW YORK

PHOTOGRAPHING APPARATUS

Application filed October 9, 1931. Serial No. 567,942.

This invention relates to photographic apparatus, and particularly to means for holding film sensitized on both sides, and including novel means for exposing the sides of the film successively to light.

A film of the character indicated will be hereinafter referred to as a "duplex" film, and the device for holding the film for exposure will be termed a "film holder".

It is an object of this invention to provide a film holder, effective to successively receive projected light and images through a single light projecting instrumentality usually including a prism, lens and bellows.

It is an object of this invention to mount a film holder in operative relation to a bellows or its frame, or to projecting instrumentalities such as may be employed in photographing and particularly in so-called commercial photography.

It is an object furthermore to provide a film holder in which film is held practically straight and at right angles to the light rays entering same when in operative position, and to provide means whereby the film holder may be turned to present the sides of the film successively to said light rays, the said film holder being normally light proof; novel means being also included for allowing light to gain access to the film holder and the film therein, or to interrupt the passage of the light rays thereto.

It is a further object of the invention to provide a film holder of the character indicated with a source of film supply preferably supported by the film holder, and to associate with the film holder, drawing means by which lengths of film are caused to travel through the film holder from the source of supply, in order that film sections of suitable length may be moved into and out of the zone of the projected light. Furthermore, it is an object to provide the film holder with film cutting means hereby lengths of film may be severed as the device is operated to photograph on lengths of film intermittently moved into and from the zone of projected light.

It is a still further object of the invention to provide means for holding film as above indicated and to assemble it with light projecting means to provide a light tight joint between them and provide means whereby the film holder may be opened when the film holder is in position to expose the film, and closed after exposure and before the holder is moved.

It is furthermore an object in one embodiment of the invention to provide mechanism for imparting rotary movement to the film holder and automatically present open sides of the film holder successively to the light projecting means while guarding the said openings against access of light to the film holder while it is being shifted as aforesaid.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views and in which—

Figure 1 illustrates a view in elevation of a photographic apparatus embodying the invention;

Figure 2 illustrates a perspective view of one of the shutters and parts associated therewith for its operation;

Figure 3 illustrates a vertical sectional view of that part of the apparatus embodying the invention;

Figure 4 illustrates a perspective view of a fragment of a ground glass frame;

Figure 5 illustrates a detailed view of the latch for holding the shutter closed;

Figure 6 illustrates a sectional view of the apparatus on the line 6—6 of Fig. 3;

Figure 7 illustrates a plan view of a film holder embodying a modification;

Figure 8 illustrates a front elevation of a fragment of the said modified form; and Figure 9 illustrates a horizontal sectional view of a fragment thereof.

In these drawings 15 denotes an ordinary bellows associated with light projecting means which may include a prism 16 and a lens of ordinary character used in commercial photography. The light projecting instrumentalities and the outer end of the bellows are supported by a frame, generally identified by the numeral 17, but as frames of this character are well known, it is believed unnecessary to describe the same in detail. It is sufficient for the purpose of this disclosure to state that the receptacle 18 is intended to receive sections of film after they have been moved through the film holder and usually those portions of the film that have been fed into the receptacle such as 18 are severed from that portion of the film which is in the film holder and about to be exposed photographically. The film holder 19, in that embodiment of the invention illustrated in Figures 1 to 6 inclusive, is of cylindrical form and it preferably has a base ring 20 with a raceway in its under surface, the said ring fitting on anti-friction elements 21 such as balls, and the balls are supported by a raceway 22 at the top of a base 23. The ring has a circumferential groove or channel 24 into which the periphery of a guiding disk 25 extends, the said disk being rotatably mounted on a stud 26 anchored to the base in any appropriate way. By means of the construction just described, the film holder is rotatable in fixed relation to the base and to the bellows 15 whose inner end is provided with a bellows frame 27 having an inner edge in light tight engagement with the external surface of the film holder.

At the top of the film holder a film magazine 28, in the present embodiment, has its lower edge fitted between flanges 29 and 30 on the cover or top wall of the film holder, it being understood that the magazine shall be provided with means for rotatably supporting a roll of film identified by the numeral 31.

The film holder has diametrically opposed openings in its wall or it may be termed its side. Obviously the holder may be circular or of other configuration and when reference is made to its side, it is meant the circumferential portion thereof. Each opening is closed by a shutter or shutters identified on the drawings by the numerals 32 and 33 and the contiguous edges of the shutters are shaped to form a light tight joint as at 34. The area of the open or inner end of the bellows is such that the bellows frame surrounds the film exposure openings and provides sufficient clearance for the shutters to open outwardly to admit light to the film holder.

At diametrically opposite locations and at right angles to the openings, film 35 is held in position to be exposed to light entering the film holder through the bellows and one of the openings in the film holder when the shutters are open. The means for holding the film in the position just indicated includes feed rollers 36 and 37 rotatably mounted transversely of the film holder and below an opening 38 formed in the top of the film holder. Other means which are associated with the aforesaid rollers include a guide roller 39 whose film engaging periphery is preferably in line with the space between the two rollers 36 and 37, and a film guiding frame 40 which is slidable vertically into and out of the film holder and held in place at each edge by guides such as 41 and 42. In order to permit the film guide to be moved into and out of the film holder, the roller 39 has its trunnions journaled in arms such as 43 and the arms are oscillatably mounted on a rod 44 in order that the roller may be swung upwardly and away from the opening in the top of the film holder. A rib 45 is connected to the arms and with them forms a rigid frame for supporting the guide roller 39. A frame 46, similar to the frame 40, is provided with ground glass 47 to be used in focusing, the focusing frame and the film guiding frame being interchangeable in the film holder so that after the focusing operation the frame 46 may be removed and the frame 40 substituted therefor. During the manipulation of the frames, as heretofore stated, the guiding roller may be moved out of the position in which it is shown in Figure 3 and moved rearwardly clear of the opening in the top of the film holder.

The rollers 36 and 37 for feeding the film are geared together as at 49, this being a conventional means of feeding film in apparatus for reproducing in commercial photography, it being understood that one of the rollers will be driven by a crank 50 which is positioned externally of the apparatus.

A film cutter of usual type comprises a stationary knife 51 and a movable knife 52 coacting therewith, the said knife 52 being mounted on the end of arms such as 53, which arms have racks 54 engaged by a toothed segment 55 so that when the toothed segment is oscillated it will force the movable knife into coactive relation with the stationary knife and sever film which has been fed downwardly from the film holder. The knife operating mechanism is retracted by means of devices such as the spring 56 having one end attached to the rack and the other secured to an anchorage 57 of the casing. The toothed segment is carried by a shaft 58 extending outside of the apparatus and having a crank handle 59 applied to it for operating the knife. A suitable gage 60 may be associated with the feeding instrumentalities for indicating the length of film moved by the operation of the feeding rollers, but this is well known in the art and need not, it is thought, be illustrated in detail.

As a means for operating the shutters, a shaft 61 is journaled in a bearing 62 secured interiorly of the film holder as by the employment of screws 63, and the said shaft projects at the top of the film holder. As the mechanism for operating the shutters at the two opposed openings is duplicated on opposite sides of the film holder, a description of the means for operating one pair of shutters will, it is thought, suffice for an understanding of this feature of the invention. The bearing 62, in the present embodiment of the invention, has a bracket or frame structure 64 at its lower edge and that portion of the shaft within the bracket is provided with a pinion 65 which rotates with the shaft. The bracket is provided with guide rollers 66 and 67 suitably spaced from the periphery of the pinion. A rack 68 guided by the roller 67 has teeth which engage the teeth of the pinion, and the said rack is pivotally connected to an arm 69 mounted on a shaft 69ª and the said shaft has a curved arm 70 connected to the shutter 32. A rack bar 71 has a rack 72 guided by the roller 66 in engagement with the pinion, and the rack bar has its opposite end connected to an arm 73 mounted on a shaft 74, the said shaft having a curved arm 75 secured to it and connected to the shutter 33. The shutters each has a bracket 76 at its lower end connected to the pivot on which the arm of said shutter is mounted, so that when the shaft 61 is rotated in opposite directions, it communicates oscillatory movement to the shutters through the racks, pinions and parts associated with them as described.

The film guide 40 has flanges 77 on one edge that are wider than the guiding flanges on the other edge which is for the purpose of producing a mask so that the margin on one side of the photographed film will be wider at one edge than the other in order that the wide edge may be used for binding purposes.

A crank handle 78 is attached to the outer end of the shaft and the said crank handle is manipulated to open and close the shutters. In order that the shutters may be held in closed positions, a latch 79 is pivoted on a post 80 and it has a spring 81 under it which serves to hold it normally elevated in the path of travel of the arm of the crank handle. The latch is provided at its outer end with a thumb piece 82 which may be pressed to force the latch out of engagement with the arm to permit the said arm to operate in opening the shutters and, when the shutters are closed, the arm will be in position to be automatically engaged by the latch.

As a modification of the film holder heretofore described, a cylindrical film holder 83 is employed and it is mounted for rotation in substantially the manner described in connection with the mounting for the film holder shown in Figures 1 to 6 etc. The film holder preferably has diametrically opposed openings such as 84 and it is mounted in operative relation to a photographing apparatus having a bellows frame or equivalent instrumentality.

At suitable locations and preferably on either side of the bellows frame, vertically disposed rollers 84' and 85 are journaled in suitable bearings such as a bearing plate 86, which bearing plate is supported by posts 87 and 88. Trunnions such as 89 of the rollers extend above the bearing plate and a toothed wheel such as 90 is secured to each trunnion. A shaft 91 is rotatably mounted in bearings such as 92 and the said shaft extends longitudinally of the plates 86. A gear wheel 93 is provided on the shaft 91 for each of the gear wheels of the rollers 84 and 85 and means are provided such as a crank handle 94 on the shaft 91 for turning the said shaft. Obviously, other means may be provided for rotating the shaft 91 and it is the purpose of the inventor that preferably the shaft be alternately turned in opposite directions, for a purpose to be explained.

A light proof or opaque web or belt 95 is applied to the periphery of the film holder and one end thereof is wound on the roller 84 and the other end thereof on the roller 85, whereas the space between the rollers is occupied by the bellows frame in a manner to completely enclose either of the openings of the film holder when they are brought into registry or alinement therewith.

By reason of this modified construction, the film holder is rotated owing to the frictional engagement of the opaque web or belt with the external surface of the said film holder, and the relation of parts is such that the openings in the film holder will be masked during the movement of the film holder, either by the bellows frame or the said opaque web or belt.

The film holder may be provided with stops 96 which will arrest the film holder when the openings are in registry with the bellows frame and in position for the film to be exposed.

The film holder of the modified construction has film guiding means and it is operated for drawing the film and mounted for rotary movement in the manner in which the first mentioned form is mounted and operated.

In describing the invention, reference has been made to "light obstructing means" or to "shutters", and since the latter is commonly known in the art, the inventor wishes it to be understood that the terms are used generically and are intended to mean any light obstructing instrumentality which, by relative movement of the film holder and the said instrumentality, accomplishes the result of interrupting the passage of light or uncovers the opening or openings with the result attending such operation.

While there is shown herein means for oppositely driving or rotating the rollers on which the opaque web or belt is wound, it is obvious that the film holder may be turned by hand and that the frictional engagement of the said web and the said film holder suffices to cause the web to be drawn from one roll and rewound on the other or means such as friction wheels may be employed on the shaft of each roller which will engage the periphery of the rotatable film holder so that by this means the rollers are turned when the film holder is rotated by hand or otherwise.

I claim:

1. In a photographing apparatus, means for projecting light, a film holder rotatably mounted in light proof association with the means for projecting light, the said film holder having openings in two opposed sides, means for supporting film in the holder between the openings, shutters for closing the openings, and means for operating the shutters to open and close them when an opening in the holder guarded thereby is in position to receive the projected light.

2. In a photographing apparatus, means for projecting light including a bellows, a means for holding film having openings in its sides between which film is held rotatably mounted in light proof relation to the bellows, shutters for the said openings in the film holder, and means for opening and closing the shutters when the parts of the holder having the openings are in position to receive light projected through the bellows.

3. In a photographing apparatus, a film holder having means for supporting film transversely thereof, the said holder having openings on opposite sides of the location of the film, light proof closures for the openings, and light projecting means with relation to which the film holder is operable and movable.

4. In a photographing apparatus, a film holder having means for supporting film transversely thereof, said holder having openings on opposite sides of the film so held, light proof elements for guarding and unguarding the openings, light projecting means having light proof connection with the film holder, and means for rotatably mounting the film holder to present opposite openings thereof to the means for projecting light.

5. In a photographing apparatus, a light projecting means, a film holder in light proof engagement therewith having means for supporting a film transversely thereof, said film holder having openings, one of which is on each side of the position occupied by the film in the holder, shutters pivotally mounted to close the openings and movable to unguard the openings, and means externally of the film holder operative to move the shutters.

6. In a photographing apparatus, a film holder having a film admitting opening in its top, means for supplying film to the film holder through said opening, means for drawing film through the film holder and holding it therein, the said film holder having openings on opposite sides of the position occupied by the film, means associated with the film holder for projecting light through the openings, means for closing the openings and operable to unguard said openings for the admission of light, and means for movably mounting the film holder with relation to the light projecting means.

7. In a photographing apparatus, a film holder, means associated therewith for supplying film thereto, means for moving film through the film holder, the said holder having openings on opposite sides of the location of the film, light proof closures for the openings with means for operating them, and light projecting means with relation to which the film holder is operative and rotatable.

8. In a photographing apparatus, a film holder having means for supporting film transversely thereof, a source of film supply for the film holder associated therewith, means for drawing film through the holder and ejecting it therefrom, means for cutting the ejected film, said holder having openings on opposite sides of the location of the film, light proof closures for the openings, light projecting means in light proof engagement with the exterior of the film holder, and means externally of the film holder for opening and closing the light proof closures when the openings are in alined relation to the light projecting means.

9. In a photographing apparatus, a film holder having means for supporting film transversely thereof, a source of film supply for the film holder associated therewith, means for drawing film through the holder and ejecting it therefrom, means for cutting the ejected film, said holder having openings on opposite sides of the location of the film, light proof closures for the openings comprising hingedly mounted shutters, means externally of the holder having operative means for moving the shutters to open and closed positions, and light projecting means in light proof engagement with the exterior of the film holder.

10. In a photographing apparatus, a film holder having internal opposed guides, a guiding frame slidably supported in said guides in which film is movable and supported in the film holder, the said film holder having opposed openings on opposite sides of the frame, light proof closures for the openings, means for operating the closures of each opening for opening or closing the same, a light projecting means having light proof contact with the external surface of the film holder with relation to which the openings of the film holder may register, and a frame having a focusing glass interchangeable with the guiding frame.

11. In a photographing apparatus, a rotatably mounted film holder having means for supporting a film therein, the said film holder having openings opposing the sides of film supported in the holder, a light impervious element partly surrounding the holder and adapted to exclude light from the holder while rotating, and means for admitting light to the openings when the holder is moved and an opening is out of the zone of action of the light excluding means.

12. In a photographing apparatus, a rotatively mounted film holder having openings in its side, means within the film holder for supporting the film across the axes of the openings, a flexible opaque material partially embracing the holder and engaging the same to communicate its movement to the rotative film holder, means for moving the flexible opaque material, and a bellows frame in light-tight engagement with a portion of the film holder out of engagement with the opaque material with relation to which the openings in the film holder are selectively alined.

13. In a photographing apparatus, a rotatively mounted film holder having openings in its side, means within the film holder for supporting the film across the axes of the openings, a flexible opaque material partially embracing the holder and operative to communicate rotary motion to the film holder, a bellows frame in light-tight engagement with a portion of the film holder out of engagement with the opaque material with relation to which the openings in the film holder are selectively alined, rotatable elements on opposite sides of the bellows frame on which the opaque material is wound, and means for communicating rotary movement to said elements.

14. In a photographing apparatus, a rotatably mounted film holder having opposed openings and internal means for supporting a film, an opaque apron partially embracing the periphery of the holder, engaging the same and operative to rotate said holder, elements on which the ends of the opaque material are wound, a bellows frame engaging the periphery of the film holder between the elements on which the opaque material is wound and with relation to which the openings of the film holder are selectively alined to permit a projected light to the film in the holder, and means for turning the said elements.

15. In a photographing apparatus, a rotatably mounted film holder having opposed openings and internal means for supporting a film, an opaque apron partially embracing the periphery of the holder and operative to rotate said holder, elements on which the ends of the opaque material are wound, a bellows frame engaging the periphery of the film holder between the elements on which the opaque material is wound and with relation to which the openings of the film holder are selectively alined to permit a projected light to the film in the holder, and means for oppositely driving each of said elements.

16. In a photographing apparatus, a rotatably mounted film holder having opposed openings in its side for the admission of light from a light projecting instrumentality, and means for selectively obstructing the entrance of light through said openings or admitting light thereto.

17. In a photographing apparatus, a reversible film holder having opposed openings in its side for the admission of light, means for holding film between said openings for exposure in the said film holder, and means for selectively interrupting the passage of light through said openings or admitting light therethrough.

18. In a photographing apparatus, a film holder having means for supporting film for exposure therein, the said film holder having means for admitting light on opposite sides of the film held therein selectively, and a light projecting instrumentality in susbtantially stationary relation to the film holder and with relation to which the openings in said film holder are selectively positioned.

19. In a photographing apparatus, a rotatably mounted film holder having opposed openings in its side for the admission of light from a light projecting instrumentality, guides for film or focusing means on opposite sides of the film holder for supporting said film or focusing means between the openings, and means for selectively obstructing the entrance of light through said openings or admitting light thereto.

GEORGE C. BEIDLER.